Figure 4:
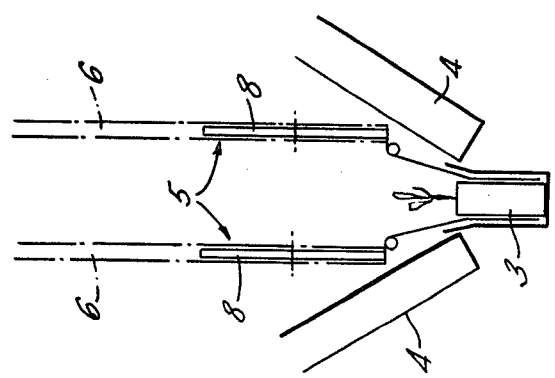

United States Patent [19]

Häkli

[11] 4,106,415
[45] Aug. 15, 1978

[54] PLANT-SETTING MACHINE

[75] Inventor: Reijo Sakari Häkli, Iso-Vimma, Finland

[73] Assignee: Lannen Tehtaat OY, Iso-Vimma, Finland

[21] Appl. No.: 730,687

[22] Filed: Oct. 7, 1976

[30] Foreign Application Priority Data

Apr. 30, 1976 [FI] Finland .................. 761221

[51] Int. Cl.² ............................................ A01C 11/02
[52] U.S. Cl. ........................................................ 111/3
[58] Field of Search ...................................... 111/2-4

[56] References Cited

U.S. PATENT DOCUMENTS

| 965,980 | 8/1910 | Autry | 111/3 |
|---|---|---|---|
| 2,009,785 | 7/1935 | Pomieraniec | 111/3 |
| 3,515,079 | 6/1970 | Ware | 111/3 |
| 3,719,158 | 3/1973 | Roths | 111/2 |

FOREIGN PATENT DOCUMENTS

| 1,136,667 | 12/1956 | France | 111/2 |
|---|---|---|---|
| 877,377 | 5/1953 | Fed. Rep. of Germany | 111/2 |
| 2,330,600 | 5/1974 | Fed. Rep. of Germany | 111/2 |
| 784,544 | 4/1951 | Norway | 111/3 |
| 880,298 | 10/1961 | United Kingdom | 111/2 |
| 324,975 | 2/1972 | U.S.S.R. | 111/2 |

Primary Examiner—Edgar S. Burr
Assistant Examiner—James R. Feyrer
Attorney, Agent, or Firm—Bierman & Bierman

[57] ABSTRACT

The invention is an improved mechanical planting machine capable of making a furrow in the ground and planting therein plants with root clods such as so-called pot-type plants. The apparatus comprises a plowshare for forming a furrow, feeding apparatus for feeding the plants into the furrow, compressing means such as pressure wheels for compacting the soil against the roots of the plant, and an operating device for supporting the plant in the selected planting position while the soil is being compacted. The operating device is the inventive feature. It comprises two parallel circulating endless elements located above the furrow with flexible wires attached at regular intervals. The device is located above the furrow so that the wires dangle down forming two parallel wire walls that penetrate the furrow and support the plant therebetween until the soil has been compacted.

7 Claims, 5 Drawing Figures

U.S. Patent  Aug. 15, 1978  Sheet 1 of 3  4,106,415
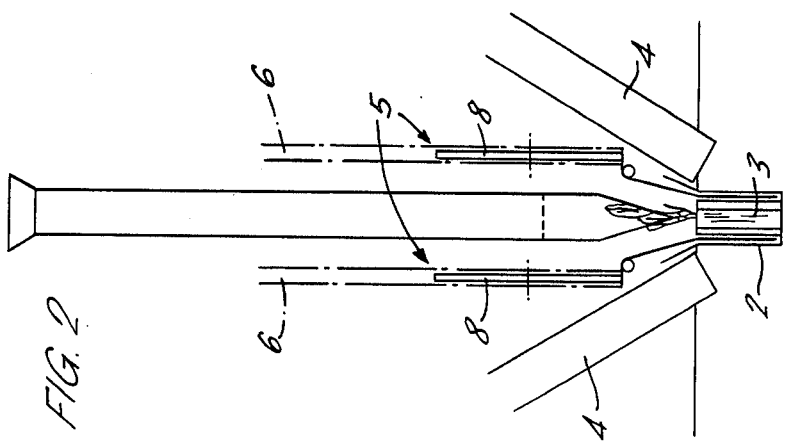
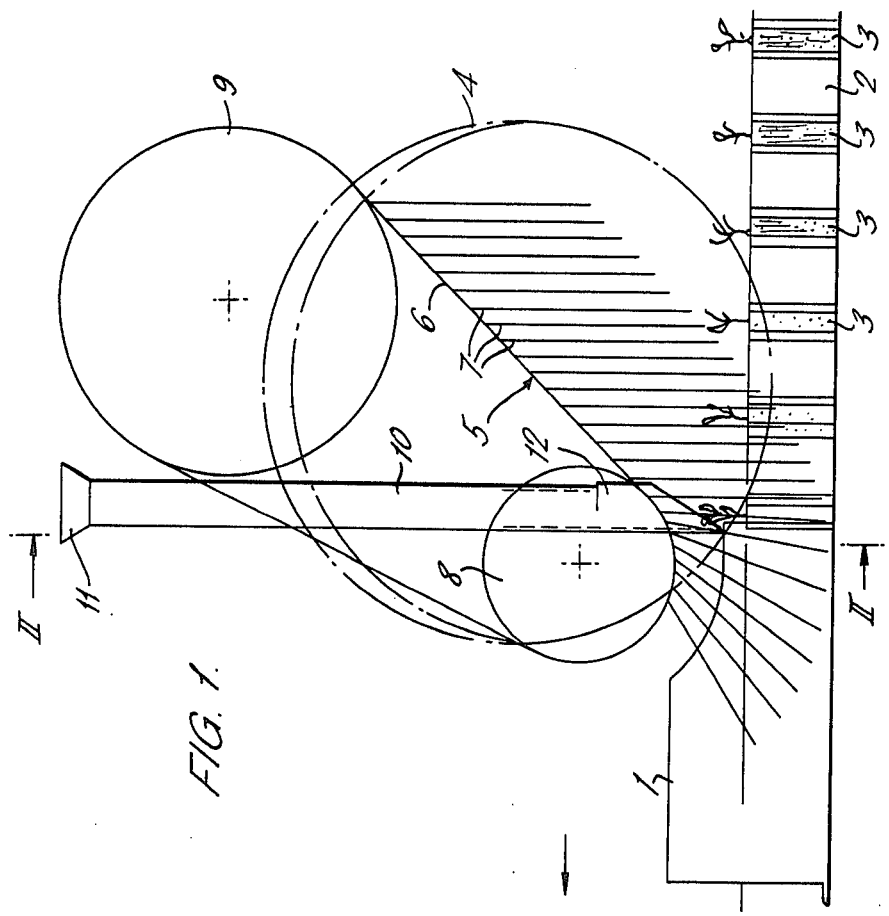

PLANT-SETTING MACHINE

The subject of the present invention is an operating device in a plant-setting machine that comprises a plowshare for the formation of a furrow in the plant soil; an apparatus for feeding and guiding plants, preferably plants which grow in pots, into a setting furrow, means for compressing the soil on both sides of the setting furrow and an operating device located above the furrow to support the plants in the setting furrow until the soil has been compressed.

The operating device comprises a pair of circulating parallel endless means such as chains about two hubs having wires attached thereto at regular intervals. The wires dangle down on either side of the bottom of the feeding apparatus to form two parallel wire walls on either side of the plants that have been deposited into the furrow by said feeding apparatus. One of the hubs about which the endless elements are mounted is nearer the furrow so that the endless elements are tilted. As a result, the bottom of the parallel wire walls follows a curved path that penetrates into the furrow at a point adjacent the feeding apparatus. Accordingly, plants fed between the wire walls into the furrow by the feeding apparatus are supported in the desired upright position by the walls while the furrow is being compressed. As the machine moves forward, the endless elements are circulated about the hubs so that the portion of the wire walls supporting the plants moves at the same speed but in a counterclockwise direction; this results in the formation of a curtain or wall, the individual elements of which adjacent the furrow move in a direction opposite to that of the machine to maintain the plants behind the machine in an upright position even while the machine is moving forward. As is apparent from the drawings, the wire walls are withdrawn from the furrow after compacting without disturbing the position of the plants as the walls continue on the upward portion of the curved path while the endless means are circulating. The compressing or compacting means can be pressure wheels.

It is known in the art to have the feeding apparatus feed the plants into the furrow at the same speed as the machine but in the opposite direction so that the plants' velocity in relation to the ground when it is deposited into the furrow is zero or at least approximately zero. In this prior art, the plant is supported in its planting position either so that it is dropped through a pair of jaws that perform the planting-sinking and open themselves into a tube or so that the plant is pressed by means of plier-shaped jaws. It is a common feature of these methods of operation that the feeding of the plants is timed in accordance with the operation of the individual planting means and that the adjustment of the plant distance is stepwise with coarse gradations. A characteristic feature is the short distance over which the plant is guided and supported as it is deposited into the furrow. The support provided is insufficient and results in an improper or less than optimum planting position for many of the plants. Moreover the planting means which grasp the plant by pressing are suitable only for certain types of plants or only for plants of a certain size unless major adjustments are undertaken.

The present invention eliminates the above drawbacks. The main inventive feature is the operating device which comprises two endless circulating, parallel means placed at a distance from each other. As previously stated, it can be chains arranged to circulate around chain wheels. On both of said endless means, wires are affixed to form flexible wire-lined walls that hang below the endless means to support and guide the plants from both sides when the plants are deposited in the furrow. The wire-lined walls press the plant between them and thereby maintain the plant in the desirable planting position throughout the entire planting step. Then after the soil has been compressed, the wires are withdrawn upwardly from the planting point without lifting or disturbing the plant from its planting position. Consequently the packing of the soil around the roots of the plant is not disturbed.

As can be readily appreciated, it is characteristic of the present planting machine that the operating device supporting the plant as it is deposited in its planting position keeps the plant in its planting position and permits it to be supported by the compressed furrow walls while the wires are withdrawn upwardly from the planting position. Actually, the wire walls support the plant even while they are being withdrawn from the furrow. This permits the optimum packing of the soil around the roots of the plant during the planting. Viewing it another way, an essential feature is the long guiding distance over which the plant is supported in its planting position. Depending on the type of feeding device employed, the plant may receive support from the wire walls even before it is actually deposited in the furrow.

Figure 3:
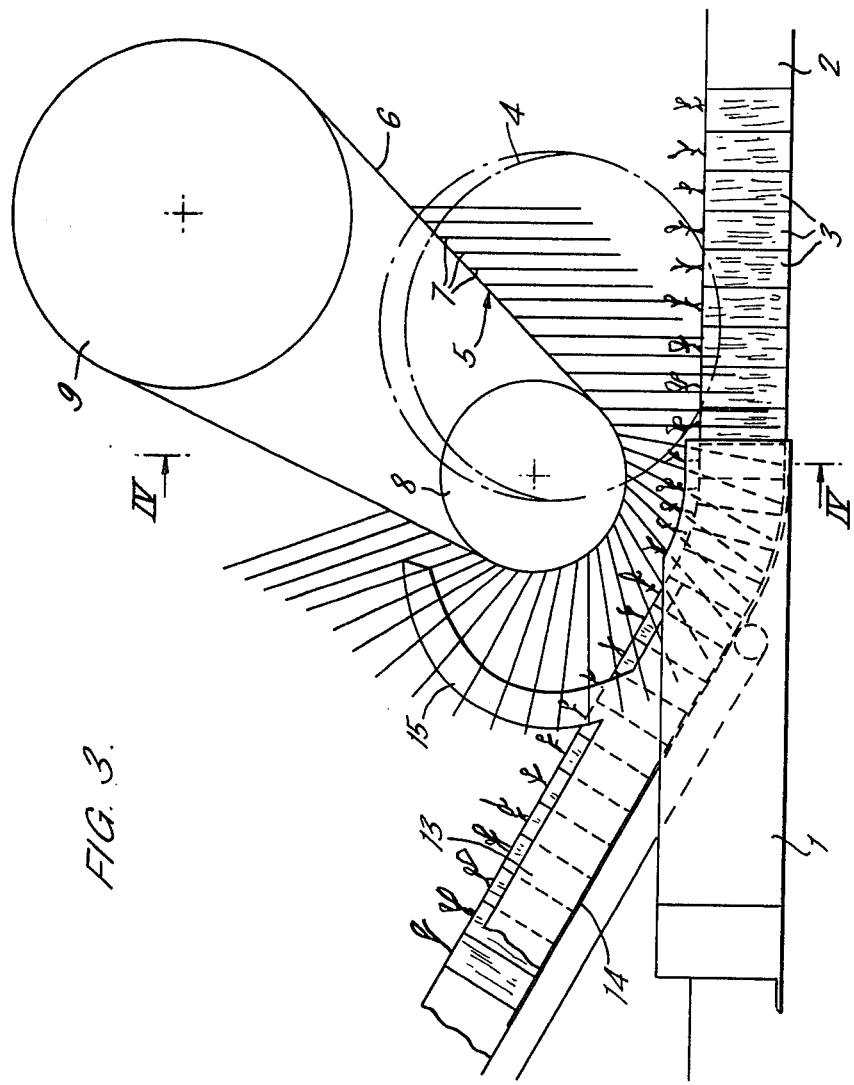
Figure 5:
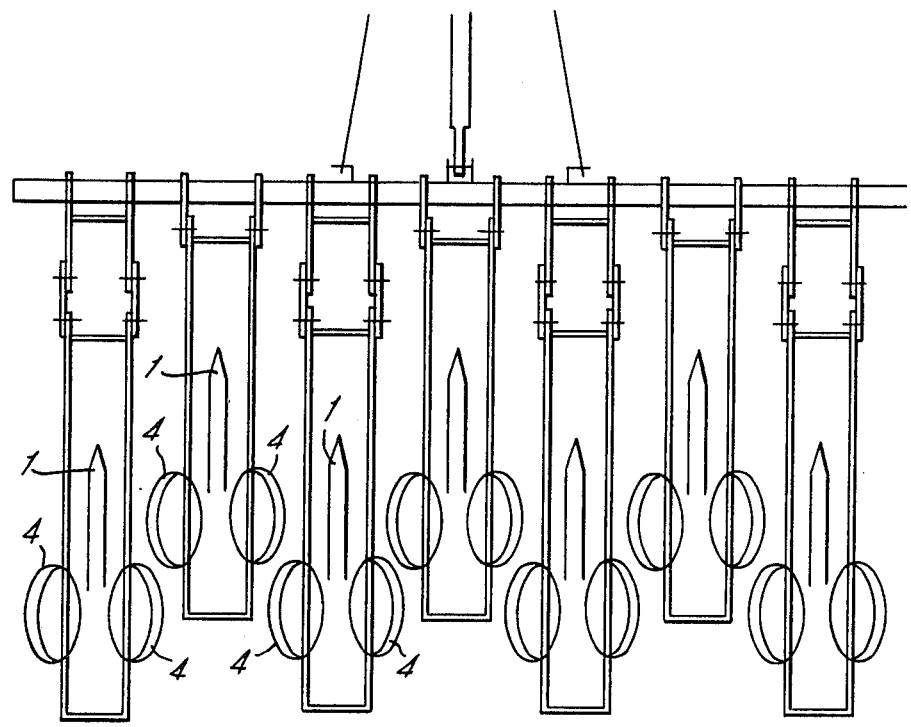

The invention may be more clearly understood from the following description and from the attached drawings, wherein FIG. 1 is a schematic representation of the principle of the planting machine in accordance with the invention as a side view, FIG. 2 shows a section along line II—II in FIG. 1, FIGS. 3 and 4 schematically show a planting machine embodiment alternative to the planting machine embodiment of FIGS. 1 and 2, and FIG. 5 is a schematic top view of several adjacent planting machines in a planting apparatus used for planting several rows of plants at a time.

In accordance with FIGS. 1 and 2, the planting machine comprises a plowshare 1 that is designed so that the bottom of the furrow 2 becomes flat. Operating device 5, as is shown in FIGS. 1 and 2, is placed above and behind two endless circulating parallel chains 6 positioned apart and circulating around chain wheels or pulleys 8 and 9. At regular intervals, chains 6 have one end of flexible wires 7 fastened to them. Wires 7 form a wire wall on each side of the plants 3 for supporting and guiding them until the soil on each side is compressed by the following pressure wheels 4.

The distance between chains 6, and consequently the distance between the flexible wire walls as well, is continuously adjustable and set in accordance with the diameter of the root clod or pot of plants 3.

For the purpose of feeding plants 3 between the wire walls, the planting machine comprises feeding pipe 10 positioned vertically or substantially vertically. The top portion of the pipe may be provided with funnel 11 and the bottom portion 12 is open towards the rear. Feeding pipe 10 is mounted so that its inclination and the position of its lower portion in relation to the endless circulating chains 6 are adjustable in the vertical plane along the direction of travel of the planting machine. When plants 3 are being planted, the planting machine proceeds in the direction indicated by the arrow in FIG. 1 and the plowshare 1 forms a furrow 2 for entry of the plants. Plants 3 are dropped down feeding pipe 10 at uniform intervals and emerge parallel to and between the two wire walls formed of flexible wires 7 at the planting portion of operating device 5. The wire walls of the planting portion have a horizontal speed component equal to the speed of the planting machine but opposite in direction. The walls 7 also have a vertical speed component directed upwardly causing the walls to be withdrawn from the furrow. From feeding pipe 10, plant 3 falls between the wire walls onto the bottom of the furrow 2. As wires 7 on planting portion of chains 6 are directed towards the planting soil, they thereby keep plant 3 in the selected planting position throughout the entire planting and soil compacting process. When the wire walls rise up around plant 3, thus withdrawing from the furrow, the plant still remains supported and in the same position.

Packing of the soil around the roots of plant 3 can start immediately after plant 3 has reached the bottom of furrow 2. Packing is accomplished by means of pressure wheels 4. The dropping rate of plants 3 together with the traveling speed of the machine determine the distance between plants, the adjustment of which can be made continuously by means well known in the art. Of course, in FIGS. 1 and 2, the schematic representation of the planting machine is highly reduced and consequently the figures do not show all details of the machine. For example, guide plates which guide wires 7 on both sides of feeding pipe 10 as said wires pass said pipe are not shown. Neither do the figures give detailed illustrations of the units of the machine by which the inclination of pipe 10, the position of its lower portion 12, and the distance between chains 6 can be adjusted as desired as they are simple mechanical expedients which would be known to those of ordinary skill in the art.

FIGS. 3 and 4 show an alternative embodiment for the planting machine of FIGS. 1 and 2. The planting machine of FIGS. 3 and 4 differs from the machine of FIGS. 1 and 2 with respect to the feeding apparatus. Feeding pipe 10 is substituted by a feeding shoot penetrating from the head between the wire walls as well as between the walls of the plowshare, inclining downwardly in the feeding direction, and being open towards the top. The bottom of the shoot has a conveyor belt 14 or the equivalent to carry the plants in a line straight onto the bottom of the planting furrow 2 between the wire walls. From the sides of the feeding shoot 13 and projecting upwardly, curved guides 15 are between the wire walls to guide them to the sides of the plants on conveyor 14. Once the plants reach the end of the feeding shoot, wire walls operate in the same way as in the embodiment of FIGS. 1 and 2 described above.

FIG. 5 is, as viewed from the top, a highly schematical representation of an apparatus for planting in which planting several machines either of FIGS. 1 and 2 or FIGS. 3 and 4 are arranged side by side so that the planting of several lines can be performed at the same time.

In the planting machines in accordance with the invention, the chains 6 can be driven, for example, by means of suitable transmission coming from the pressure wheels 4 to one or both of the chain wheels. The planting machine may, of course, be made automatic to feed plants into the feeding pipe 10 or feeding shoot 13 at the proper rate of feed.

The invention is, of course, not restricted to the exemplifying embodiments described above, but it may be varied within the scope of the patent claims.

What we claim is:

1. A plant setting machine comprising a plowshare for the formation of a furrow, a feeding apparatus mounted behind said plowshare for feeding and guiding plants into said furrow, means mounted behind said feeding apparatus for compressing the soil on both sides of the furrow after the plants have been set therein, and an operating device for holding said plants in an upright position in said furrow until the compressing is completed, said operating device comprising a first pair of laterally spaced pulleys mounted on said machine above and on opposite sides of said furrow and substantially above the point of deposit of said plants in said furrow, a second pair of spaced pulleys mounted on said machine spaced from and parallel to said first pair of pulleys and adapted to be driven in the direction of movement of said plowshare, a pair of endless means interconnecting the corresponding pulleys of said two pairs, and a plurality of flexible members attached to each of said endless means at relatively short intervals whereby said flexible members on each such endless means form a pair of walls on opposite sides of the deposited plants, moving in a direction opposite to that of the movement of said plowshare whereby said walls laterally support said plants and maintain their position until said compressing means compacts the sides of the furrow to fix the position of said plants.

2. A plant setting mechanism according to claim 1 in combination with means supporting a plurality of plows, feeding apparatus, soil compressing means and operating devices in ganged relationship.

3. The apparatus according to claim 1 wherein said feeding apparatus comprises a substantially vertical pipe and a funnel located on the upper portion of said pipe for guiding said plants into said pipe, the lower portion of said pipe extending between said walls above said furrow for depositing said plants into said furrow.

4. The apparatus according to claim 3 wherein the said lower portion of said pipe is open on the side opposite said plowshare to facilitate the depositing of the plant into the furrow.

5. The apparatus according to claim 1 wherein said feeding apparatus comprises a chute inclined downward in a direction opposite to that of the movement of the plowshare and terminating between said walls so that the plants can be fed down the chute into a selected position in the furrow.

6. The apparatus according to claim 5 in combination with a conveyor belt mounted at the bottom of the chute for carrying the plants to the furrow.

7. The apparatus according to claim 5 further comprising guides projecting upward from said chute between said wire walls for guiding said walls to the sides of plants deposited in the furrow by said chute.

* * * * *